Oct. 22, 1940.　　　　A. W. ELLIOTT　　　　2,219,100
STORAGE BATTERY LIFTER AND CARRIER
Filed May 31, 1939
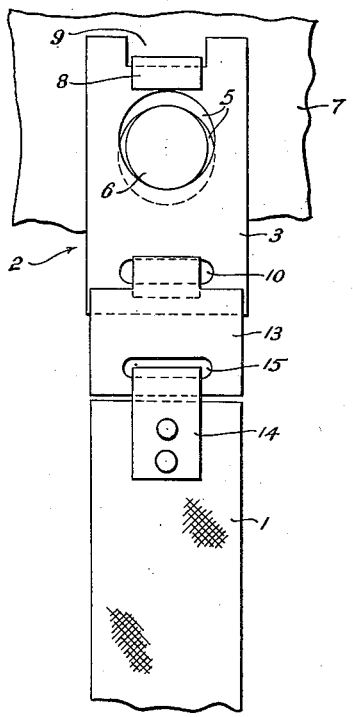
Fig. 1
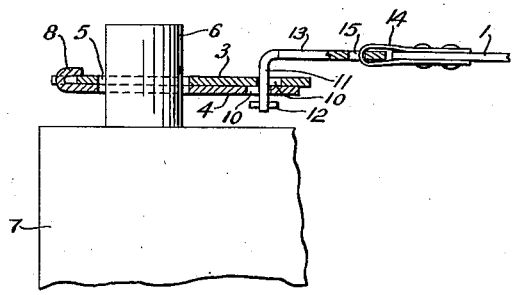
Fig. 2
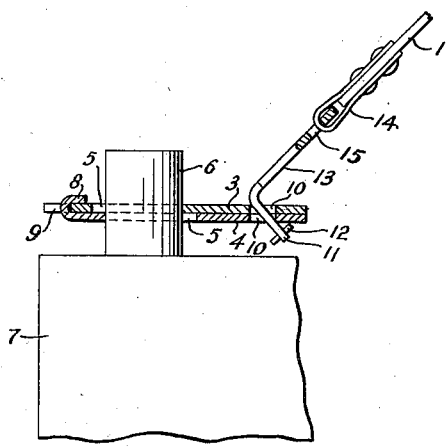
Fig. 3
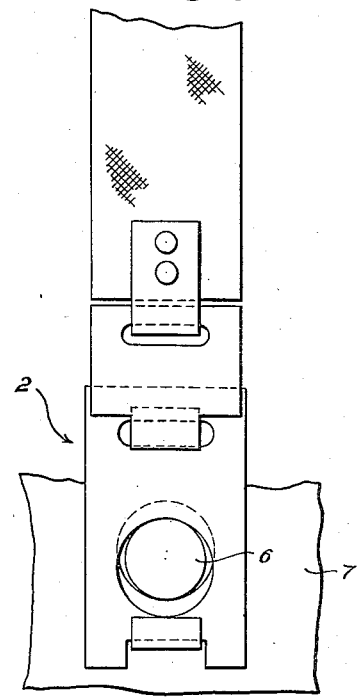
INVENTOR:
ARTHUR WILLIAM ELLIOTT
BY Alex. E. MacRae
ATTORNEY.

Patented Oct. 22, 1940

2,219,100

UNITED STATES PATENT OFFICE 2,219,100

STORAGE BATTERY LIFTER AND CARRIER

Arthur William Elliott, Kingston, Ontario, Canada

Application May 31, 1939, Serial No. 276,613
In Canada May 9, 1939

5 Claims. (Cl. 294—103)

The invention relates to improvements in lifters and carrying devices for storage batteries and especially to storage batteries and other objects to be handled of the type used in motor vehicles; and the principal objects of the improvement are, first, to provide a lifter and carrier for hand operation to be used with a storage battery to ensure that the grip on the battery posts is effective and secure under all circumstances; second, to eliminate the hazard of slipping.

The invention will be particularly described with reference to the accompanying drawing, in which, Figure 1 is a plan view of a device constructed in accordance with the invention in clamping engagement with an object to be handled;

Figure 2 is a partial sectional elevation of the device in non-clamping association with an object;

Figure 3 is a partial sectional elevation of the device in clamping position.

Referring to the drawing, the device comprises a lifting and carrying strap consisting of a flexible link 1 of leather, webbing or other suitable material, to one or each end of which is secured a clamping assembly 2. The latter consists of a pair of superimposed metal plates 3 and 4 loosely secured to each other for limited relative longitudinal movement and having corresponding openings 5 therein of a size and shape adapted, when the openings are in registry, to encompass loosely a portion of an object to be handled. Such a portion may be, as shown, a post 6 of a battery 7, and in this instance, a similar clamping assembly 2 is secured to each end of strap 1 for application to the respective battery post. When the device is adapted to be applied to a cylindrical member such as the post 6, the openings 5 are circular in shape and of slightly greater diameter than that of the post.

The means for securing the plates 3 and 4 to each other includes a tongue 8 extending upwardly from one end of the lower plate 4 and through a notch 9 in the corresponding end of upper plate 3 and bent over the upper surface of the latter. Each plate is provided adjacent its other end with a transverse slot 10. A rocker plate or lever 11 extends loosely through the slots 10 whereby rocking of the lever imparts limited longitudinal sliding movement to each plate 3 and 4 in opposite directions. The lever is maintained in assembled relation with the plates by means of a pin 12 adjacent the lower edge thereof. If desired, instead of the pin 12, the lower edge portion of the lever may be flared outwardly to prevent its withdrawal from the slots. The lever 11 has an arm 13 extending at right angles from the upper edge thereof and the strap 1 is linked thereto by means of the band 14 which extends through a slot 15 in the arm and is riveted to the strap.

The flexible link 1 previously referred to, and shown in Figure 1, serves also as an insulator for the two metal end-assemblies that contact the battery posts. The said flexible link 1 is the part which the operator grasps when using the device to lift or carry a battery.

In the device there is a difference in the positioning of the drilled holes in the plates 3 and 4 relative to the slotted holes in the said plates so that an upward pull of the flexible connection acting against the weight of the battery causes the lever 11, as illustrated in Figure 3, acting in an oblique direction to exert forces parallel in direction but opposite in sense on the plates 3 and 4, thereby causing the drilled holes that accommodate the battery posts to be eccentric and it is obvious that one plate grips one side of the battery post while the other plate grips the other side of the post. It is obvious also that the application of a greater lifting force due to a greater weight being lifted results in an increased gripping action. It is also apparent that the same action takes place simultaneously at the two ends of the lifting and carrying device.

It will be observed from the foregoing that my device acts to give maximum security during the lifting and carrying of a battery and eliminates the hazard of the battery slipping from the grip of the end plates.

While I have described and illustrated but one embodiment of my device, I wish it understood that I may vary the details thereof without departing from the spirit or narrowing the scope of my invention.

While I have described my invention for manual lifting and carrying of batteries the same device and design may be used on larger equipment for doing similar work when the lifting and carrying is being done by machine.

I am aware that prior to my invention battery lifters and carriers have been made using single plate grip. I therefore do not claim to be the original inventor of this type of device or equipment; but

I claim:

1. In a lifting device, a pair of superimposed plates having limited relative longitudinal movement with respect to each other, each of said plates having an opening therein, the edges of said openings when in registry being adapted to be placed in slightly spaced encompassing relation with a portion of an object to be lifted, a slot in each of said plates removed from said openings and communicating with each other, the edges of said slots being out of registry with each other when the edges of said openings are in registry, and means in said communicating slots to move the edges of said slots towards registry and cause longitudinal movement in opposite directions of said plates to place the edges of said openings out of registry and in gripping relation with said object.

2. In a lifting device, a pair of superimposed plates loosely secured to each other for limited relative longitudinal movement, said plates having openings therein the edges of which when in registry are adapted to be placed in slightly spaced encompassing relation with a portion of an object to be lifted, said plates also having slots therein, a lever extending loosely through said slots, and means restraining withdrawal of the lever from the slots, and means for rocking said lever to impart longitudinal movement to said plates in opposite directions comprising an arm angularly extending from said lever and integral therewith and a strap connected to said arm.

3. In a lifting device, a pair of superimposed plates loosely secured to each other and each having an opening therein, the edges of said openings when in registry being adapted to be placed in slightly spaced encompassing relation with a portion of an object to be lifted, said plates also having slots therein, a lever extending loosely through said slots, and means for rocking said lever to impart opposite longitudinal movement to each of said plates comprising an arm extending at right angles from said lever, and a strap connected to said arm.

4. In a lifting device, a pair of superimposed plates, means at one end of the plates and integral therewith for loosely securing each to the other, said plates having openings therein the edges of which when in registry are adapted to be placed in slightly spaced encompassing relation with a portion of an object to be lifted, said plates also having transverse slots therein adjacent the other end thereof, a lever extending through said slots, and means restraining withdrawal of the lever from the slots, and means for rocking said lever to impart longitudinal movement to said plates in opposite directions comprising an arm angularly extending from said lever and integral therewith and a strap connected to said arm.

5. In a lifting device, a pair of superimposed plates, one of said plates having an integral tongue embracing a portion of the other plate, said plates having openings therein the edges of which when in registry are adapted to be placed in slightly spaced encompassing relation with a portion of an object to be lifted, said plates also having transverse slots therein, a lever extending through said slots, means restraining withdrawal of the lever from the slots, and means for rocking said lever to impart longitudinal movement to said plates in opposite directions comprising an arm angularly extending from said lever and integral therewith and a strap connected to said arm.

ARTHUR WILLIAM ELLIOTT.